2,934,443

IMPACT RESISTANT CERAMIC DIELECTRIC AND METHOD OF MAKING SAME

Haskiel R. Shell, Norris, Tenn., and Jay E. Comeforo, Frenchtown, N.J., assignors to the United States of America as represented by the Secretary of the Interior No Drawing. Application October 10, 1957
Serial No. 689,458

25 Claims. (Cl. 106—39)

(Granted under Title 35, U.S. Code (1952), sec. 266)

This invention herein described and claimed, may be manufactured and used by or for the Government of the United States of America, for governmental purposes without the payment of any royalties thereon or therefor.

This invention relates to a synthetic fibrous mineral material and more particularly to methods for its preparation and the fabrication of articles of superior qualities therefrom.

Ceramics having a high impact resistance have long been sought in view of their obvious advantages to the industrial and domestic arts. Among the objects of our invention are: (1) a ceramic having superior impact resistance in comparison to the ceramics presently available; (2) a ceramic having good resistance to thermal shock and excellent electrical insulating properties; (3) a ceramic dielectric having high absorption for short wave radiation such as gamma rays, or X-rays; (4) a method for producing ceramics composed of a fibrous synthetic mineral, alone, or in admixture with a glass, where the composition of the glass may be the same or different from the fibrous material.

Further objects of our invention will become apparent from the following description and claims:

As is well known, ceramics are inherently brittle materials. Paradoxically, however, ceramics are more nearly perfectly elastic than any other type material. It is because of this close approach to ideal elasticity in the technical sense that they are so brittle. Stress is directly proportional to strain, and the elastic limit cannot be exceeded without rupturing the material. This property has made a truly flexible, malleable ceramic unavailable. It has been proposed to achieve some improvement in the properties of ceramics by incorporating therein fibers, needle-shaped natural minerals, or organic materials such as asbestos, flax, or straw. Another method which has been used is to employ ceramic compositions which form a needle-like crystal phase. In all these methods, the fibrous or crystalline materials act to reinforce the ceramics, in a manner analogous to steel rods in reinforced concrete.

However, most of these methods are not too successful in practice because the heat treatment required to mature the ceramic usually results in the destruction of the strength-imparting properties of the additive. Either the temperature destroys the additive, or the ceramic raw materials react chemically with the additives.

Limited success is obtained by the use of compositions which form acicular crystals, such as mullite, in the ceramic during the firing operation. However, these crystals are always inflexible and increase the impact resistance solely by increasing the area in which the break occurs, thereby increasing the breaking force necessary.

Another ceramic-type material in which flexible non-metallic crystalline materials are added for the purpose of improving impact resistance is glass bonded mica and/or asbestos. The compositions contain as a maximum no more than 70 percent of the crystalline material, and usually nearer 50 percent. The products of the instant invention as will appear more fully hereinafter, do not correspond to these compositions, and have substantially different properties.

The present invention comprises compositions of the general formula

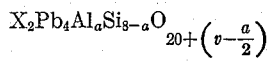

wherein $a$ is 0 to 2, and $v$ is the valence of X. Usually X is $K^+$, but may be substituted by $Pb^{++}$, $Tl^+$, $Rb^+$, ($K^+$, $Ba^{++}$) and $K^+$, $Cs^+$). $Ba^{++}$ and $Cs^+$ can only partially replace the $K^+$ ion. The compositions are prepared by mixing the pure anhydrous carbonates or oxides of the desired elements together with pure silica in the proper stoichiometric amounts, and heating in a sealed crucible for a few hours at 700–800° C. and then raising the temperature to 1000° C. A viscous liquid is formed which may be allowed to cool to a glass and then be crushed to a powder, or it may be poured into water to form a frit. The finely divided glass is remelted, and then allowed to cool, after being seeded to form fibrous crystals of the synthetic mineral.

These fibers are mixed with a sintered glass-precursor mass to be described hereinafter, glass frit or other finely divided glass material of the same or different composition, formed to the desired shape and then fired to vitrification. When the glass frit and the crystalline material are of the same composition the heating operation may be regulated so as to devitrify the glass, forming a dense ceramic composed essentially of a single crystalline material. By using glass and fibers of isomorphic composition it is possible to obtain ceramics comprising more than one crystalline material.

The essential component in the superior ceramics of this invention are synthetic, inorganic, crystalline, flexible fibers having the composition $K_2Pb_4Si_8O_{21}$, or their isomorphs. Fiber length is of the order of 50 microns to 1 centimeter. The amount and length of fiber influence impact resistance, porosity, firing shrinkage and other physical properties of the ceramics. By varying these two factors, therefore, the characteristics of the ceramic may be controlled.

These fibrous silicates are easily crushed into a fluffy light asbestos-like mass. By the addition of inorganic bonding agents such as talc, bentonite, magnesium or aluminum hydroxides, or phosphoric acids, fibers may be pressed into sheets. Organic binders may be employed to give strong pliable sheets. The acicular nature of the material makes it a desirable strength imparting filler for plastics.

The most satisfactory bonding material for these synthetic mineral fibers is a glass frit of the same general composition as the fibers, i.e., of the identical composition, or its closely related isomorphs. Among the advantages of using a glass of the same general composition are: (1) the coefficient of thermal expansion of the crystalline fibers and the glass bond are very close, thereby making a thermally strong ceramic; (2) the fibers and the glass do not react at the firing temperatures, so that the flexibility of the fibers are not affected; and (3) after heating the mass to bond the fibers to the glass and eliminate voids introduced during the forming step, the heating conditions may then be adjusted to devitrify the mass and form thereby a dense ceramic comprising essentially a mass of fibrous crystals.

The ingredients employed in making the ceramics of a preferred embodiment of the invention are: (a) a glass frit of the composition $K_2Pb_4Si_8O_{21}$, or an analogue thereof; (b) a crystalline fibrous phase of the same composition; and (c) a sintered material of the same composition. The constituents are ground to the requisite size for the intended application, mixed to form a homogeneous mass, formed into the desired shape by dry-pressing, casting or extruding, dried and then fired. These various steps are conventional in the art and need not be further described.

While the temperature to which the ceramic is heated is dependent upon the ratios of crystalline fiber to the other ingredients, as well as by the properties desired, the temperature (in the case of $K_2Pb_4Si_8O_{21}$) must be less than 780° C. and is usually greater than 600° C.

In addition, for some applications it may be desirable to have a glass of a composition non-analogous to that of the synthetic crystalline fibers employed as bond. Specific properties required, for example, such as low firing temperature, or a given thermal expansivity, which are attributable primarily to the bond, may necessitate the use of a different bond. If desired, any ceramics which are porous can be readily glazed to form impervious bodies.

Glass bonding temperatures in general lie between the softening point of the glass as the lower limit and the melting temperature of the fibers as the upper limit. With the crystalline fibers of this invention, the upper limit may be as high as about 800° C. depending on the composition, while the lower limit is the softening point of the glass employed as a bond, which may be around 600° C. for example.

Among the advantages of this novel ceramic are the following:

(1) Articles can be fabricated using conventional ceramic techniques.

(2) The firing temperature employed in this process are at least 300° C. lower than that required with the usual ceramics currently employed.

(3) Possesses high impact and thermal shock resistance.

(4) Has excellent electrical insulating properties.

(5) May be made glass-free.

(6) Exact control of composition may be readily obtained since the ceramic is a synthetic. By contrast, exact control of the chemical composition of ceramics produced from naturally occurring minerals is difficult.

The following examples illustrate the method used for preparing the fibrous crystals, glass frit and sintered material of the instant invention, referring particularly to the $K_2Pb_4Si_8O_{21}$ composition.

CRYSTALLIZATION OF $K_2Pb_4Si_8O_{21}$; PREPARATION OF GLASS

Anhydrous, reagent-grade potassium carbonate, reagent lead oxide (PbO), and silica sand (99.92% SiO) is well mixed in the ratio $K_2CO_3 + 4PbO + 8SiO_2$ (i.e. parts by weight 1:6.46;3.48, respectively). The mixture was placed in a fire-clay crucible, covered, and sealed. Heating in an oxidizing atmosphere was at such a rate as to prevent loss from carbon dioxide evolution. Preferably this was accomplished by heating for a few hours at 700°–800° C., during which time the carbon dioxide was largely eliminated by reaction in the solid state. The temperature was then raised to 1000° C. to produce a viscous liquid, which was allowed to cool to solid glass in the crucible, then broken out and crushed. Alternately, the liquid at 1000° C. may be poured directly into water to form a frit which was very easily crushed in a mortar. Chemical analysis showed that the loss of components by either method was inconsequential. As determined by index-of-refraction measurements of the glass, one melting did not yield a homogeneous product. Hence, before crystallization, the crushed or fritted material was remelted at 1000° C. for several hours or overnight. In addition to homogenizing the melt, the remelting eliminated bubbles that, even at 1000° C., came to the surface only slowly.

Sintered material was prepared by heating the raw ingredients as set forth above to 600° C. for about 12–15 hours, grinding the resulting product, and then refiring to 680° C. for about 12–15 hours, and grinding the sintered mass to minus 100 mesh. Grinding the mass to minus 200 mesh size did not result in any improved results. This material is to be understood as included within the scope of "glass-material" as used in the specification and claims.

Other elements may be substituted for K and Si to form isomorphic compositions. Appropriate compounds containing the elements desired are substituted in calculated amounts in the method given in the example showing the production of $K_2Pb_4Si_8O_{21}$. Rubidium replaces potassium in all proportions to form the end member $Rb_2Pb_4Si_8O_{21}$. The rubidium compounds are all similar and isostructural with the potassium compounds. Thallium likewise replaces potassium in all proportions but the end member, $Th_2Pb_2Si_8O_{21}$ crystallizes rather poorly. The cesium ion replaces potassium to a limited extent, apparently being too large. The formula for the cesium containing silicate may be written $(K_f^+, Cs_g^+)Pb_4Si_8O_{21}$, $f$ and $g$ being small positive members and $f+g=2$. Barium replaces potassium up to $(K, Ba_{0.5})$ only, that is, $(K^+, Ba_{0.5}^{++})$ is substituted for $(K_2^+)$. In other words, with Ba the formula becomes $(K_d^+, Ba_e^{++}) Pb_4Si_8O_{21}$, $d$ and $e$ being small positive members, $e$ being greater than zero and no more than 0.5, the sum of $d+2e$ being 2. Lead replaces potassium in all proportions. Aluminum can replace silicon in part, the maximum substitution being two out of the eight silicon ions, that is, $(Al_2^{3+}, Si_6^{4+})$ may be substituted for $(Si_8^{4+})$. It is to be understood, of course, that in these substitutions, the sum of the negative and positive valencies is zero.

LEAD-ALUMINUM SILICATE

The isomorph $Pb_2Pb_4(Al_2Si_6)O_{21}$ exhibits interesting properties. Its crystal structure and fibrous habit are similar to $K_2Pb_4Si_8O_{21}$, although it is somewhat more brittle and the fibers less flexible. The crystalline material melts congruently at 811° C. The high lead content makes it especially valuable as a ceramic for blocking gamma and X-ray radiation.

CRYSTALLIZATION OF $K_2Pb_4Si_8O_{21}$ FROM MASSIVE GLASS

"Massive glass" is the term used herein to describe glass prepared as described in the preceding section and was essentially free of bubbles and devoid of strains. Such glass did not crystallize readily on cooling below the melting point. Instead nucleation was very slow and unpredictable, and probably depended more on solid impurities and entrapped bubbles than autonucleation. However, once a nucleus formed, or if seeded, the crystals of potassium-lead silicate grew at a fairly uniform rate for a given temperature.

The growth rate of $K_2Pb_4Si_8O_{21}$ crystals in massive glass was determined by immersing a seed crystal or crystals, attached to a platinum wire, into the glass one-third up from the bottom of a glazed porcelain beaker. Approximate size of the beaker was 6½ cm. I.D. by 13 cm. length; the amount of glass used was about 1200 gm. The growth rate at several temperatures, as measured by the rate of advance of crystals into the glass, is stated in Table 1.

Table 1.—*Growth rate of $K_2Pb_4Si_8O_{21}$ crystals in massive glass of same composition*

| Temperature, ° C. | Growth rate, mm. per hour | Temperature, ° C. | Growth rate, mm. per hour |
|---|---|---|---|
| 600 | 0.03 | 720 | 0.07 |
| 640 | .06 | 725 | .04 |
| 680 | .12 | 730 | .03 |
| 700 | .13 | 740 | .02 |
| 710 | .11 | 760 | .004 |

The rate reached a maximum of 0.13 mm. per hour at 700° C. At 760° C. the rate of growth was approaching zero; it had decreased progressively to 0.03 mm. per hour at 600° C., the lowest temperature at which measurements were made. The platinum wire was as effective in seeding as the potassium-lead silicate crystals, but the glazed porcelain beaker did not seed the glass appreciably at any temperature. Crystallization of the potassium-lead silicate nucleated by seed or by the platinum wire took the form of numerous small crystals radiating outward from the nucleation center. Growth outward was along one of the $a$ axes, the fiber being perpendicular to the $a$ axes and parallel to the $c$ axis. The average length of fiber from these experiments in seeding was 1 to 2 mm.

A melt of 114 lbs. prepared as indicated above, was held at 710° C. for five days to induce self-nucleation, and then held at 725–730° C. for fifty-two days. Eighty pounds of crystals were obtained, all in the bottom two-thirds of the glazed earthware container. From 10 to 20 percent of the crystals were 1 to 2 cm. in length, and the average size was about .5 cm.

CRYSTALLIZATION OF $K_2Pb_4Si_8O_{21}$ FROM GLASS POWDER OF THE SAME COMPOSITION

A melt prepared in the manner previously shown was allowed to cool to a glass, then crushed and ground to minus 200 mesh. The glass powder was then placed in a suitable container and heated to 650°–700° C. Crystallization occurred rapidly and completely to give a product consisting essentially of microcrystalline $K_2Pb_4Si_8O_{21}$. The microcrystals have an X-ray diffraction spectrum similar to that given by microcrystals from massive glass.

The rapid crystallization from powdered glass results from the facts that nucleation at the fractured edges is fast and that the average diameter of the particles is small ($<0.07$ mm. for a minus-200-mesh powder). Thus the crystallization, which is probably proceeding from all sides of the particle, has only 0.02 to 0.03 mm. to go before completion. At a growth rate of 0.13 mm. per hour, this could be accomplished in less than 14 minutes. The net result is that, for finely powdered glass, crystallization is complete virtually by the time that a specimen may be heated and cooled. Quantitative data on devitrification vs. time at 700° are given in Table 2. The powder used was minus-100-plus 200-mesh, 13 percent, and minus-200-mesh, 87 percent. Within 7 minutes all the finer particles had crystallized, and within 1 hour crystallization, as determined by petrographic examination, was essentially complete. Minus-300-mesh glass powder crystallized nearly completely in 3½ minutes at 700° C. The effect of temperature, at a constant time of 15 minutes, is given in Table 3. The glass powder used was the same material as in Table 1. The most complete devitrification was obtained in the 15-minute soak at 650° C. Since growth rate was greatest at 700° C., the greater devitrification at 650° C. must have meant that nucleation was more rapid at the latter temperature.

Table 2.—*Crystallization of glass powder at 700° C.*

| Time, minutes: | Amount crystallized percent |
|---|---|
| 7 | 70–80 |
| 15 | 85–90 |
| 30 | 95–98 |
| 60, 120, 240 | >99 |
| 480 | 100 |

Table 3.—*Crystallization of glass powder in 15 minutes at different temperatures*

| Temperature °C.: | Amount crystallized, percent |
|---|---|
| 500 | 5–10 |
| 600 | 75 |
| 650 | >95 |
| 700 | 85–90 |
| 725 | 10 |
| 750 | <2 |

Single crystals of macro size nucleated and grew extremely slowly from massive glass of the formula $Pb_2Pb_4(Al_2Si_6)O_{21}$. Similar to the potassium compound, however, devitrification from homogeneous powdered glass is rapid and complete.

CERAMIC TEST SPECIMENS $K_2Pb_4Si_8O_{21}$

The potassium lead silicate fibers and microcrystalline material and their analogues and isomorphs, either alone or in combination, have, as indicated previously, a number of properties that make them suitable for the fabrication of ceramic articles. These desirable properties and characteristics include purity of chemical composition, excellent electrical insulating qualities, ease of fabrication at relatively low temperatures (600°–780° C.) to form an all-crystalline body, resistance to thermal shock, and high impact resistance.

Table 4 shows results of five tests performed on bodies produced from various combinations of ingredients. Combinations of 0 to 25% fibrous $K_2Pb_4Si_8O_{21}$ with 100 to 75% glass composition of the same formula may be employed with good results. All specimens shown in the examples of the table were made by first compressing the starting $K_2Pb_4Si_8O_{21}$ material employed, and then firing the formed body to the indicated temperature, under ordinary pressure. The resistance to impact was determined qualitatively by bouncing sound discs on a wooden surface and comparing these results with those obtained using other materials. The improved impact resistance results from the "all fiber" composition of the ceramic body. The other properties were determined using standard testing procedures. The body may be made dense and impervious with an apparent porosity of zero; or, if desired, the degree of porosity can be controlled within fairly close limits. Strength, as indicated by the modulus of rupture, may be as high as 12,000

Table 4.—*Examples and properties of specimens from potassium-lead silicate combinations*

| Example No. | | 1 | 2 | 3 | 4 | 5 |
|---|---|---|---|---|---|---|
| Fiber | wt.-percent | 100 | 20 | 20 | 10 | 0 |
| Glass, frit | do | 0 | 0 | 80 | 90 | 100 |
| Sintered | do | 0 | 80 | 0 | 0 | 0 |
| H₂O content (dry-pressed) | | 25 | 15 | 7 | 7 | 7 |
| Forming pressure | p.s.i. | 18,000 | 9,000 | 18,000 | 9,000 | 9,000 |
| Forming temperature | °C. | 750 | 650 / 750 | 700 | 600 | 600 |
| Soak time | hr. | 48 | 18 / 40 | 48 | 48 | 48 |
| H₂O absorption | percent | 11 | 8 | 4 | 0 | 0 |
| Apparent porosity | do | 34 | 25 | 14 | 0 | 0 |
| Modulus of rupture | p.s.i. | 5,000 (bends) | 7,000 | 6,000 | 9,000 | 12,000 |
| Shrinkage, linear | percent | 0.3 | 0.04 | 5.0 | 9.4 | 11.3 |
| Power factor (1 mc.) | | 0.008 | 0.0006 | 0.005 | 0.0005 | 0.0006 |
| Dielectric constant (1 mc.) | | 4.55 | 5.26 | 6.22 | 7.76 | 7.80 |
| Impact resistance | | Excellent | Very good | Good | (¹) | (¹) |

¹ Like steatite ceramics.

We claim:
1. A method of preparing a ceramic article of manufacture of improved impact resistance which comprises admixing a crystalline fibrous mineral composition corresponding to the formula

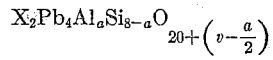

wherein $X_2$ is a member of the class consisting of $K_2^+$, $Tl_2^+$, $Rb_2^+$, $Pb_2^{++}$, $(K_d^+, Ba_e^{++})$ and $(K_f^+, Cs_g^+)$, in the latter two members the $Ba^{++}$ and $Cs^+$ replacing $K^+$ in the said formula to a limited extent, and wherein $a$ is 0 to 2; $v$ is the valence of K; $d$, $e$, $f$, and $g$ are small positive members greater than zero and $(d+2e)=2=(f+g)$, with a finely divided glass material having the said formula of the class consisting of glass, glass frit and sintered glass-precursor mass, and mixtures thereof, pressure forming the mixture into an article, and then firing the formed article to the glass bonding temperature range, whereby the fibers are bonded in a glass having analogous composition.

2. A method of preparing a ceramic article of manufacture of improved impact resistance which comprises admixing a crystalline fibrous mineral composition corresponding to the formula

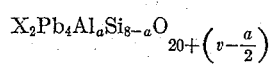

wherein $X_2$ is a member of the class consisting of $K_2^+$, $Tl_2^+$, $Rb_2^+$, $Pb_2^{++}$, $(K_d^+, Ba_e^{++})$ and $(K_f^+, Cs_g^+)$, in the latter two members the $Ba^{++}$ and $Cs^+$ replacing $K^+$ in the said formula to a limited extent, and wherein $a$ is 0 to 2; $v$ is the valence of K; $d$, $e$, $f$, and $g$ are small positive members greater than zero and $(d+2e)=2=(f+g)$, with a finely divided glass material having the said formula of the class consisting of glass, glass frit and sintered glass-precursor mass, and mixtures thereof, pressure forming the mixture into an article, and then firing the article to the glass devitrification temperature range, whereby a dense essentially glass-free ceramic is produced.

3. A method of preparing a ceramic article of manufacture of improved impact resistance, which comprises admixing a crystalline fibrous mineral composition corresponding to the formula $K_2Pb_4Si_8O_{21}$ with a finely divided glass material of the general formula

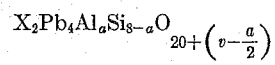

wherein $X_2$ is a member of the class consisting of $K_2^+$, $Tl_2^+$, $Rb_2^+$, $Pb_2^{++}$, $(K_d^+, Ba_e^{++})$ and $(K_f^+, Cs_g^+)$, in the latter two members the $Ba^{++}$ and $Cs^+$ replacing $K^+$ in the said formula to a limited extent, and wherein $a$ is 0 to 2; $v$ is the valence of K; $d$, $e$, $f$, and $g$ are small positive members greater than zero and $(d+2e)=2=(f+g)$, said glass material being selected from the class consisting of glass, glass frit and sintered glass-precursor mass, and mixtures thereof, pressure forming the mixture into an article and then firing the formed article to the glass bonding temperature range, whereby the fibers are bonded in a glass of analogous composition.

4. A method of preparing a ceramic article of manufacture of improved impact resistance, which comprises admixing a crystalline fibrous mineral composition corresponding to the formula $K_2Pb_4Si_8O_{21}$ with a finely divided glass material having the said formula of the class consisting of glass, glass frit and sintered glass-precursor mass, and mixtures thereof, pressure forming the mixture into an article and then firing the formed article to the glass bonding temperature range, whereby the fibers are bonded in the glass.

5. A method of preparing a ceramic article of manufacture of improved impact resistance, which comprises admixing a crystalline fibrous mineral composition corresponding to the formula $K_2Pb_4Si_8O_{21}$ with a finely divided glass material having the said formula of the class consisting of glass, glass frit and sintered glass-precursor mass, and mixtures thereof, pressure forming the mixture into an article and then firing the article to glass devitrification temperature range, whereby a dense, essentially glass-free ceramic is produced.

6. A method of preparing a ceramic article of manufacture of improved impact resistance and opacity to short wave radiation, which comprises admixing a crystalline fibrous mineral composition corresponding to the formula $Pb_2Pb_4Al_2Si_6O_{21}$ with a finely divided glass material having the said formula of the class consisting of glass, glass frit and sintered glass-precursor mass, and mixtures thereof, pressure forming the mixture into an article and then firing the formed article to the glass bonding temperature range, whereby the fibers are bonded in the glass.

7. A method of preparing a ceramic article of manufacture of improved impact resistance and opacity to short wave radiation, which comprises admixing a crystalline fibrous composition corresponding to the formula $Pb_2Pb_4Al_2Si_6O_{21}$ with a finely divided glass material having the said formula of the class consisting of glass, glass frit and sintered glass-precursor mass, and mixtures thereof, pressure forming the mixture into an article and then firing the article to glass devitrification temperature range, whereby a dense, essentially glass-free ceramic is produced.

8. The method of preparing an impact resistant ceramic article of manufacture containing crystalline mineral fibers of the formula $K_2Pb_4Si_8O_{21}$, which comprises admixing 0 to 25% by weight of a fibrous crystalline material having a formula corresponding to $K_2Pb_4Si_8O_{21}$ with 100 to 75% of a finely divided glass composition having the same formula, pressure forming the mixture into an article and firing said article to a temperature of 600 to 780° C.

9. The method of preparing an impact resistant ceramic article of manufacture which comprises pressure forming an article from finely divided glass frit having the composition $K_2Pb_4Si_8O_{21}$ and firing the said article at a temperature of between 600 and 780° C.

10. The method of preparing an impact resistant ceramic article of manufacture consisting solely of crystalline fibers of the formula $K_2Pb_4Si_8O_{21}$ which comprises admixing about 20 parts by weight of fibers of said composition with about 80 parts by weight of glass frit of the same composition, pressure forming an article from said mixture, and firing the said article at a temperature of between about 650 and about 780° C.

11. The method of preparing an impact resistant ceramic article of manufacture consisting solely of crystalline fibers of the formula $K_2Pb_4Si_8O_{21}$, which comprises pressure forming an article of said fibers and firing said article at a temperature of 650 to 780° C.

12. An improved shaped ceramic article of manufacture, comprising crystalline fibers having the formula

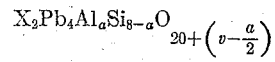

wherein $X_2$ is a member of the class consisting of $K_2^+$, $Tl_2^+$, $Rb_2^+$, $Pb_2^{++}$, $(K_d^+, Ba_e^{++})$ and $(K_f^+, Cs_g^+)$, in the latter two members the $Ba^{++}$ and $Cs^+$ replacing $K^+$ in the said formula to a limited extent, and wherein $a$ is 0 to 2; $v$ is the valence of K; $d$, $e$, $f$, and $g$ are small positive members greater than zero and $(d+2e)=2=(f+g)$, bonded in a glass matrix.

13. An improved shaped ceramic article of manufacture, comprising crystalline fibers having the formula $$X_2Pb_4Al_aSi_{8-a}O_{20+\left(v-\frac{a}{2}\right)}$$

wherein $X_2$ is a member of the class consisting of $K_2^+$, $Tl_2^+$, $Rb_2^+$, $Pb_2^{++}$, $(K_d^+, Ba_e^{++})$ and $K_f^+, Cs_g^+)$, in the latter two members the $Ba^{++}$ and $Cs^+$ replacing $K^+$ in the said formula to a limited extent, and wherein $a$ is 0 to 2; $v$ is the valence of X; $d$, $e$, $f$, and $g$ are small positive members greater than zero and $(d+2e)=2=(f+g)$, bonded in a glass matrix having the said formula.

14. An improved shaped ceramic article of manufacture comprising crystalline fibers having the formula $K_2Pb_4Si_8O_{21}$, bonded in a glass matrix of the same formula.

15. An improved shaped ceramic article of manufacture, comprising crystalline fiber having the formula $Pb_2Pb_4Al_2Si_6O_{21}$ bonded in a glass matrix of the same formula.

16. An improved shaped ceramic article of manufacture, consisting essentially of crystalline fibers having the composition $Pb_2Pb_4Al_2Si_6O_{21}$.

17. A ceramic composition having the formula $$(K_bRb_c)Pb_4Si_8O_{21}$$

wherein $b+c$ are equal to 2 and $c$ is greater than zero.

18. A ceramic composition having the formula $$Rb_2Pb_4Si_8O_{21}$$

19. A ceramic composition having the formula $$(K_bTl_c)Pb_4Si_8O_{21}$$

wherein $b+c$ are equal to 2 and $c$ is greater than zero.

20. A ceramic composition having the formula $$Tl_2Pb_4Si_8O_{21}$$

21. A ceramic composition having the formula $$(K_d^+, Ba_e^{++})Pb_4Si_8O_{21}$$

wherein $d+2e=2$, "$e$" being greater than zero, but no more than 0.5.

22. A ceramic composition having the formula $$(K^+, Ba_{0.5}^{++})Pb_4Si_8O_{21}$$

23. A method of preparing a ceramic article of manufacture of improved impact resistance containing crystalline mineral fibers which comprises admixing 0 to 100% of a crystalline fibrous mineral composition corresponding to the formula $$X_2Pb_4Al_aSi_{8-a}O_{20+\left(v-\frac{a}{2}\right)}$$

where X is a member of the class consisting of $K_2^+$, $Tl_2^+$, $Rb_2^+$, $Pb_2^{++}$, $(K_d^+, Ba_e^{++})$ and $(K_f^+, Cs_g^+)$, in the latter two members the $Ba^{++}$ and $Cs^+$ replacing $K^+$ in the said formula to a limited extent, and wherein $a$ is 0 to 2; $v$ is the valence of X; $d$, $e$, $f$, and $g$ are small positive members greater than zero and $(d+2e)=2=(f+g)$, with 100 to 0% of a finely divided glass material having the said formula of the class consisting of glass, glass frit and sintered glass precursor mass, and mixtures thereof, the sum of the percentages of the crystalline composition and glass material being equal to 100, pressure forming the mixture into an article, and then firing the formed article to a temperature range of from above about 600° C. to below the melting point of the fibrous crystal composition whereby a dense ceramic comprising crystalline mineral fibers is produced.

24. An improved shaped ceramic article of manufacture, consisting essentially of crystalline fibers having the composition $$X_2Pb_4Al_aSi_{8-a}O_{20+\left(v-\frac{a}{2}\right)}$$

wherein $X_2$ is a member of the class consisting of $K_2^+$, $Tl_2^+$, $Rb_2^+$, $Pb_2^{++}$, $(K_d^+, Ba_e^{++})$ and $(K_f^+, Cs_g^+)$, in the latter two members the $Ba^{++}$ and $Cs^+$ replacing K in the said formula to a limited extent, and wherein $a$ is 0 to 2; $v$ is valence of X; $d$, $e$, $f$, and $g$ are small positive members greater than zero and $(d+2e)=2=(f+g)$, said article being prepared by the steps of pressure forming a mass of said crystalline material into an article, then firing the formed article at a temperature in the range of from above about 600° C. to below the melting point of the crystalline fibrous composition.

25. An improved shaped ceramic article of manufacture consisting essentially of crystalline fibers of $$K_2Pb_4Si_8O_{21}$$

prepared by the steps of pressure forming a mass of said crystalline fibers into an article and then firing the formed article to a temperature in the range of from above about 600° C. to below about 780° C.

References Cited in the file of this patent

UNITED STATES PATENTS

| | | |
|---|---|---|
| 2,693,668 | Slayter | Nov. 9, 1954 |
| 2,736,714 | Tiede | Feb. 28, 1956 |

OTHER REFERENCES

Geller et al.: "The System of $K_2O$—PbO—$SiO_2$," August 1936, Nat'l Bureau of Standards Research Paper 911 (page 284).